United States Patent
Minato et al.

(10) Patent No.: US 8,054,923 B2
(45) Date of Patent: Nov. 8, 2011

(54) RADIO RECEIVER

(75) Inventors: Hirotaka Minato, Tokyo (JP); Fujio Hayakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/121,954

(22) PCT Filed: Oct. 5, 2009

(86) PCT No.: PCT/JP2009/005153
§ 371 (c)(1),
(2), (4) Date: Mar. 31, 2011

(87) PCT Pub. No.: WO2010/084536
PCT Pub. Date: Jul. 29, 2010

(65) Prior Publication Data
US 2011/0188609 A1    Aug. 4, 2011

(30) Foreign Application Priority Data
Jan. 23, 2009   (JP) .................................. 2009-013120

(51) Int. Cl.
*H04B 7/10* (2006.01)
*H04L 1/02* (2006.01)

(52) U.S. Cl. ........ 375/347; 375/349; 375/346; 375/267; 375/260; 455/500; 455/101

(58) Field of Classification Search ................. 375/374, 375/349, 346, 267, 260; 455/500, 101
See application file for complete search history.

(56) References Cited

U.S. PATENT DOCUMENTS

| | | | |
|---|---|---|---|
| 5,349,360 A | | 9/1994 | Matsui |
| 6,032,033 A | * | 2/2000 | Morris et al. ............... 455/277.2 |
| 6,556,559 B1 | * | 4/2003 | Mitsume et al. ............... 370/350 |
| 6,799,026 B1 | * | 9/2004 | Scherzer et al. ........... 455/279.1 |
| 6,931,081 B2 | | 8/2005 | Meijer et al. |
| 7,577,452 B2 | * | 8/2009 | Kimura et al. ................ 455/502 |
| 2005/0003772 A1 | | 1/2005 | Nemoto |
| 2005/0014520 A1 | * | 1/2005 | Kimura et al. ................ 455/502 |
| 2005/0107048 A1 | * | 5/2005 | Saunders et al. .............. 455/101 |

FOREIGN PATENT DOCUMENTS

| | | |
|---|---|---|
| JP | 4-157931 A | 5/1992 |
| JP | 5-259736 A | 10/1993 |
| JP | 9-93170 A | 4/1997 |
| JP | 2001-358627 A | 12/2001 |
| JP | 2004-349805 A | 12/2004 |
| JP | 2005-223784 A | 8/2005 |

OTHER PUBLICATIONS

Japanese Office Action, App. # 2010-545707, Jan. 12, 2011.

* cited by examiner

*Primary Examiner* — Phuong Phu
(74) *Attorney, Agent, or Firm* — Birch, Stewart, Kolasch & Birch, LLP (57) ABSTRACT

A radio receiver for receiving an existing analog broadcast and a terrestrial digital radio broadcast transmitting digital signals, the receiver having a plurality of antennas 11a, 11b, and composed of a diversity receiver 12 for receiving terrestrial digital radio broadcasts by antenna switching; and a controller 21 for disabling diversity reception when the number of receivable broadcasting stations acquired by station selection operation is a predetermined number or more.

6 Claims, 5 Drawing Sheets

| Memory Number | Frequency | Call Sign | Band |
|---|---|---|---|
| 1 | 92.3 | WMXD-HD | FM |
| 2 | 93.1 | WDRQ-HD | FM |
| 3 | 94.7 | WCSX-HD | FM |
| 4 | 95.5 | WKQI-HD | FM |
| 7 | 103.5 | WMUZ-HD | FM |
| 8 | 104.3 | WOMC-HD | FM |
| 9 | 105.1 | WMGC-HD | FM |
| 10 | 105.9 | WDMK-HD | FM |
| 11 | 106.7 | WDTW-HD | FM |
| The Number of Stations in Urban Area | N | | |

|  | N: Predetermined Number in The Number of Stations |
|---|---|
| Metropolitan Area | N1 |
| Small and Medium-Sized Metropolitan Areas | N2 |
| Other Area | N3 |

RADIO RECEIVER

TECHNICAL FIELD

The present invention relates to a radio receiver which receives a terrestrial digital radio broadcast that simultaneously transmits an analog broadcast and digital signals by using the frequency of already-existing analog broadcasting, and which is particularly suitable for use in a vehicle.

BACKGROUND ART

In a vehicle radio receiver included in radio receivers, to reduce the effects of the fading caused by the movement of a vehicle and secure the ability of the radio to receive analog broadcasting, diversity reception that selects an antenna which is in the best receiving condition from among a plurality of antennas is in widespread use.

However, the main reasons of the noise and the distortion of a received sound include multipath interference. The multipath interference is caused by the mutual interference of a plurality of signals propagating through different routes from a transmitter of a broadcasting station to reach an antenna. For example, a direct wave directly reaching thereto from a transmission antenna and some reflected waves are superimposed on each other, and the phase differences therebetween and the like extremely reduce the signal intensity of the received signal. Depending on the differences of path length between the received waves, if the difference of path length is small, a multipath interference wave having a short delay time reaches the antenna, and if the difference of path length is large, a multipath interference wave having a long delay time reaches thereto.

The level of multipath interference varies depending on geographical and building conditions. Particularly in an urban area where high-rise buildings stand side by side along both sides of a road, a broadcast wave propagates along a road, and is reflected by high-rise buildings to generate reflected waves having a short delay time. Therefore, when a large number of multistory buildings stand, a broadcast wave contains a lot of received signals with a short delay time.

Since a vehicle moves in such a changing radio wave environment during the running thereof, there may easily occur fluctuations in the electric field strength more frequently in a short time. Therefore, an antenna switching for selecting an antenna existing in the best receiving condition may easily occur frequently.

On the other hand, in recent years, terrestrial digital radio broadcasting is popularized, which simultaneously transmits analog and digital signals using the frequency of existing AM/FM analog broadcasting. In North America, about 1700 or more broadcasting stations have started the hybrid broadcasting by an IBOC (In-Band On-Channel) method, or are getting ready for sending. The hybrid broadcasting can use the same frequency as that of the existing analog broadcasting, different from the terrestrial digital radio broadcasting of Japan, and thus a broadcasting station need not afresh prepare a frequency for digital broadcasting. A radio receiver using a conventional analog method can receive existing broadcasting, and at the same time a hybrid radio receiver capable of receiving digital broadcasting can also receive digital one.

Incidentally, in a hybrid radio receiver capable of receiving the hybrid broadcasting using the above IBOC method, it is known that in performing antenna switching while receiving digital broadcasting, "out-of-synchronization" in digital demodulation occurs by the phase difference between the switched antennas. Particularly in an urban area, there frequently easily occurs the "out-of-synchronization" by the antenna switching.

In order to avoid the reduction of the ability for receiving the hybrid broadcasting using the above IBOC method due to the "out-of-synchronization," an IBOC broadcasting receiver in a related art is known, which controls diversity reception to be disabled when it is judged that an IBOC broadcast wave exists based on a demodulation result (for example, see Patent Document 1).

PRIOR ART DOCUMENTS

Patent Documents

Patent Document 1: JP-A-2004-349805

SUMMARY OF THE INVENTION

According to the technique disclosed in Patent Document 1 described above, the IBOC broadcasting receiver controls diversity reception to be enabled upon receiving an existing analog broadcast and controls diversity reception to be disabled upon receiving an IBOC broadcast, thus obtaining the optimum receiving environments for receiving the existing analog broadcast and the IBOC broadcast, respectively.

However, the above-discussed switching between the diversity receptions depends on a demodulation result, and the magnitude of the number of receivable broadcasting stations is not reflected. Thus, for example, the influence of multipath interference at the time of running in an urban area is not considered, and the receiver cannot be adaptable to reception environment changing in real time. Further, since the diversity reception discussed above is switched self-controlled, a user's intention is not reflected, which is a problem also in customer convenience.

The present invention has been made to solve the above-mentioned problems, and an object of the present invention is to provide a hybrid radio receiver which enables diversity reception to be controlled with high flexibility, and is excellent in convenience.

In order to solve the above-discussed problems, the hybrid radio receiver according to the present invention is a hybrid radio receiver for receiving an existing analog broadcast and a terrestrial digital radio broadcast transmitting digital signals by using the frequency of the analog broadcast, the receiver having a plurality of antennas, and including: a diversity receiver for receiving terrestrial digital radio broadcasts by antenna switching; and a controller for disabling diversity reception when the number of receivable broadcasting stations acquired by a station selection operation is a predetermined number or more.

According to the present invention, a hybrid radio receiver can be provided, which enables the control of diversity reception with high flexibility, and is excellent in convenience.

BEST MODE FOR CARRYING OUT THE INVENTION

Embodiments of the present invention will now be described with reference to the accompanying drawings in order to explain the present invention in more detail.

First Embodiment

Figure 1:
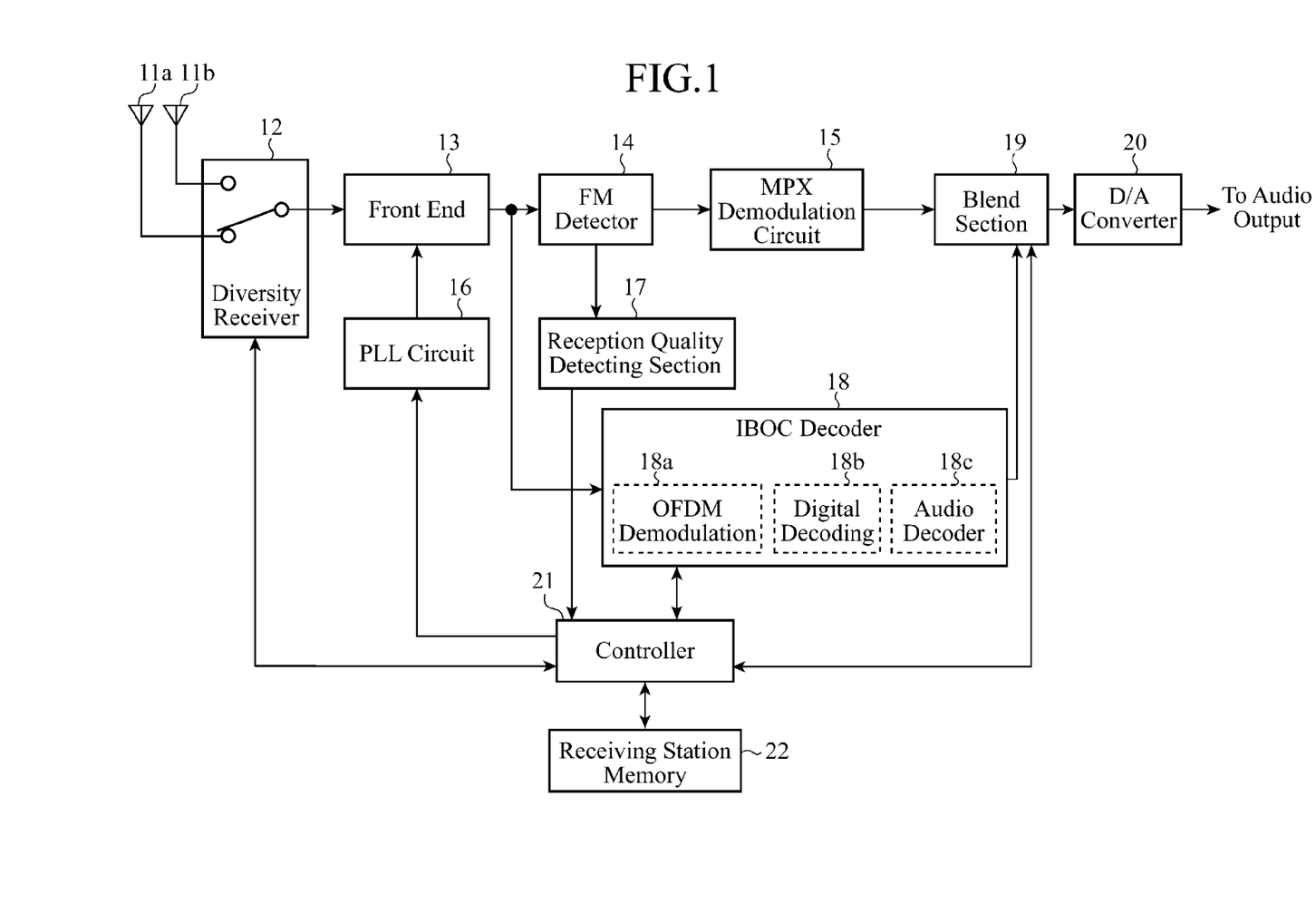
FIG. 1 is a block diagram showing a configuration of a radio receiver in accordance with a first embodiment of the present invention.

FIG. 1 is a block diagram showing a configuration of a hybrid radio receiver (hereinafter, referred to as an HD radio receiver) in accordance with a first embodiment of the present invention.

As shown in FIG. 1, the HD radio receiver in accordance with the first embodiment of the present invention is composed of antennas 11a, 11b, a diversity receiver 12, a front end 13, an FM detector 14, a multiplexer (MPX) demodulation circuit 15, a PLL (Phase Locked Loop) circuit 16, a reception quality detecting section 17, an IBOC decoder 18, a blend section 19, a DA converter (DAC) 20, a controller 21, and a receiving station memory 22.

In the arrangement of the HD radio receiver described above, the HD radio broadcasting waves received by the antenna 11a are sent to the front end 13 through the diversity receiver 12, and after a desired station has been selected by the front end, the wave is converted into a wave of intermediate frequency (IF). Further, the frequency signal converted into IF by the front end 13 is AD-converted by an AD (Analog/Digital) converter (not shown), and is supplied to the FM detector 14 and the IBOC decoder 18. The front end 13 is arranged to be controlled by the PLL circuit 16 including a programmable divider, and perform station selection operations by a frequency division ratio being set by the controller 21.

Detection outputs of the FM detector 14 are supplied to the MPX demodulation circuit 15, and are separated into signals of R (right) and L (left) channels in the case of stereophonic broadcasting.

The IBOC decoder 18 demodulates the signals in an IBOC mode. The IBOC decoder contains well-known functional blocks such as OFDM (Orthogonal Frequency Division Multiplexing: orthogonal frequency division multiplexing) demodulation 18a, digital encoding 18b, an audio decoder 18c for performing demodulation including audio compression and decoding, of the received signals, and the like. Audio data to be decoded and generated here is inputted to the blend section 19.

The blend section 19 blends the received sound of the analog broadcast wave sent through the MPX demodulation circuit 15 (hereinafter, referred to as analog received sound) and the received sound of the digital broadcasting wave sent through the IBOC decoder 18 (hereinafter, referred to as digital received sound) and outputs the blended sound to the DAC 20.

The controller 21 is composed of a microcomputer with built-in memory, for instance, and by the programs recorded in the memory being read out one by one and run by the microcomputer, the controller controls the blend section 19 such that, based on a signal-to-noise ratio (S/N) indicating the degree of degradation of the audio signal outputted from the reception quality detecting section 17; received electric field strength (RSSI: Received Signal Strength Indication); and the processing result of the OFDM demodulation 18a outputted from the IBOC decoder 18, if the OFDM demodulation is possible, the digital received sound is outputted from the blend section 19, and if the OFDM demodulation is impossible, the analog received sound is outputted from the blend section 19.

Starting from power activations, or operations by a user to a SEEK button allocated in an operating section (not shown), the controller 21 also controls the PLL circuit 16 to perform tuning operation while changing the frequency, and stores the frequencies selected as receivable broadcasting stations and information such as the names of the broadcasting stations or the like in the receiving station memory 22.

Further, when the number of receivable broadcasting stations acquired by the station selection operation is a predetermined number or more, the controller 21 controls the diversity receiver 12 to perform the control for reducing the frequency of antenna switching. The details thereof will be discussed later with reference to the flowchart shown in FIG. 2.

Figure 2:
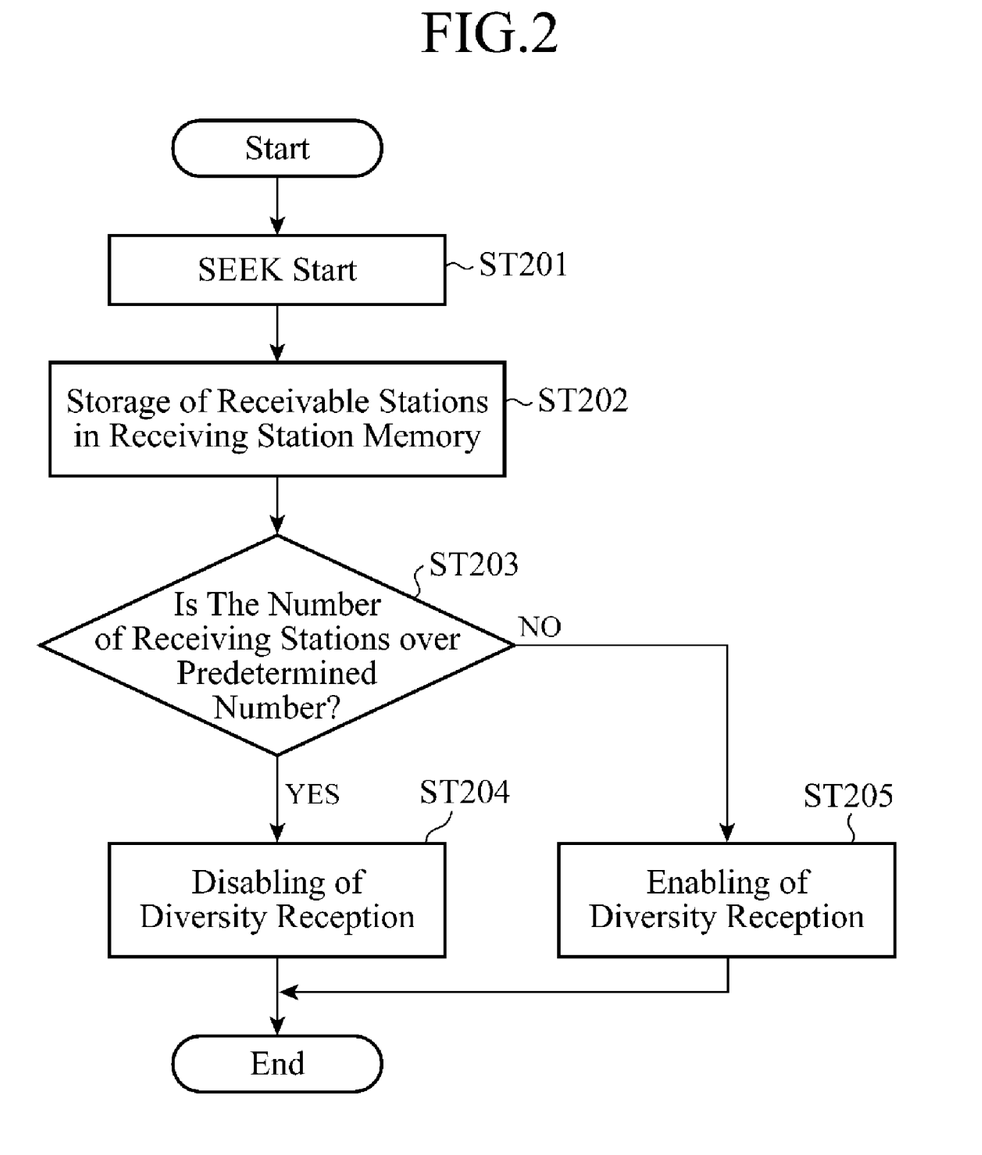
FIG. 2 is a flowchart showing an operation of the radio receiver in accordance with the first embodiment of the present invention.

FIG. 2 is a flowchart showing an operation of the HD radio receiver in accordance with the first embodiment of the present invention, and the procedure of the controller 21 shown in FIG. 1 is shown in detail therein.

The operation of the HD radio receiver in accordance with the first embodiment of the present invention shown in FIG. 1 will now be described with reference to the flowchart of FIG. 2 in more detail.

When power is turned on, or the SEEK switch is operated by a user, the controller 21 performs station selection operations while changing the frequency division ratio of the PLL circuit 16 (step ST201), and stores the frequencies of receivable broadcasting stations in the receiving station memory 22 (step ST202).

Here, as to a standard of judgment on whether a broadcasting station is a receivable one, if the received electric field strength outputted by the reception quality detecting section 17 is of the order of about −90 to −110 dBm or more, for example, in the case of an FM radio station, the controller 21 judges that the station is receivable.

Subsequently, the controller 21 counts the number of receivable broadcasting stations stored in the receiving station memory 22 to judge whether there are receivable broadcasting stations of a predetermined number or more (step ST203).

Here, when it is judged that there are receivable broadcasting stations of the predetermined number or more (step ST203 "YES"), the controller 21 controls the diversity receiver 12 to disable the diversity reception (step ST204), and when there are not stations of the predetermined number or more (step ST203 "NO"), the controller controls the diversity receiver 12 to cause the diversity receiver to enable the diversity reception (step ST205). It is to be noted that disabling the diversity reception means that either one of the antennas 11a, 11b for receiving digital broadcasting is controlled to be turned off and the other antenna 11a or 11b is caused to fix the broadcast reception.

Incidentally, densely populated megalopolises are bristling with a lot of FM stations, and tend to have broadcasting stations concentrated thereinto. In the U.S., 1700 or more HD radio broadcasting stations have started to simultaneously broadcast analog and digital signals, or are getting ready for sending digital signals.

Of those stations, about 82 broadcasting stations in Illinois State, for example, are broadcasting at different or the same frequency; however, of the 82 stations, 59 stations exist in Chicago, five stations are present in Champaign remote about 200 km or more from Chicago, three stations exist in Quincy, and one broadcasting station is situated in Bloomington. In Michigan State, of about 62 broadcasting stations, there are 43 ones in Detroit, and stations tend to be concentrated in urban areas.

Therefore, if a predetermined number N of receivable broadcasting stations, which becomes criteria for judgment in suppressing diversity reception control, is selected from among 4-40 broadcasting stations, for instance, it is possible to make a judgment about whether or not the area is an urban one. Further, it is also possible to previously count and define the number of receivable broadcasting stations while running, for example, in an urban area or an area far from an urban area.

Hereupon, although illustrations are omitted, when a navigation system is used, which includes a map DB (Data Base) working as a storage section and a GPS (Global Positioning System) functioning as a position detecting section, or an HD radio receiver synchronized with a PND (Personal Navigation Device) is used, it is also possible to retrieve broadcasting stations existing within a predetermined distance range centering on a vehicle position specified by the GPS, and thereby count the number of stations as the number of receivable broadcasting stations, by receiving the current position of a vehicle from the navigation system or the PND, and referring to the map DB storing facility information including broadcasting station information.

Figure 3:
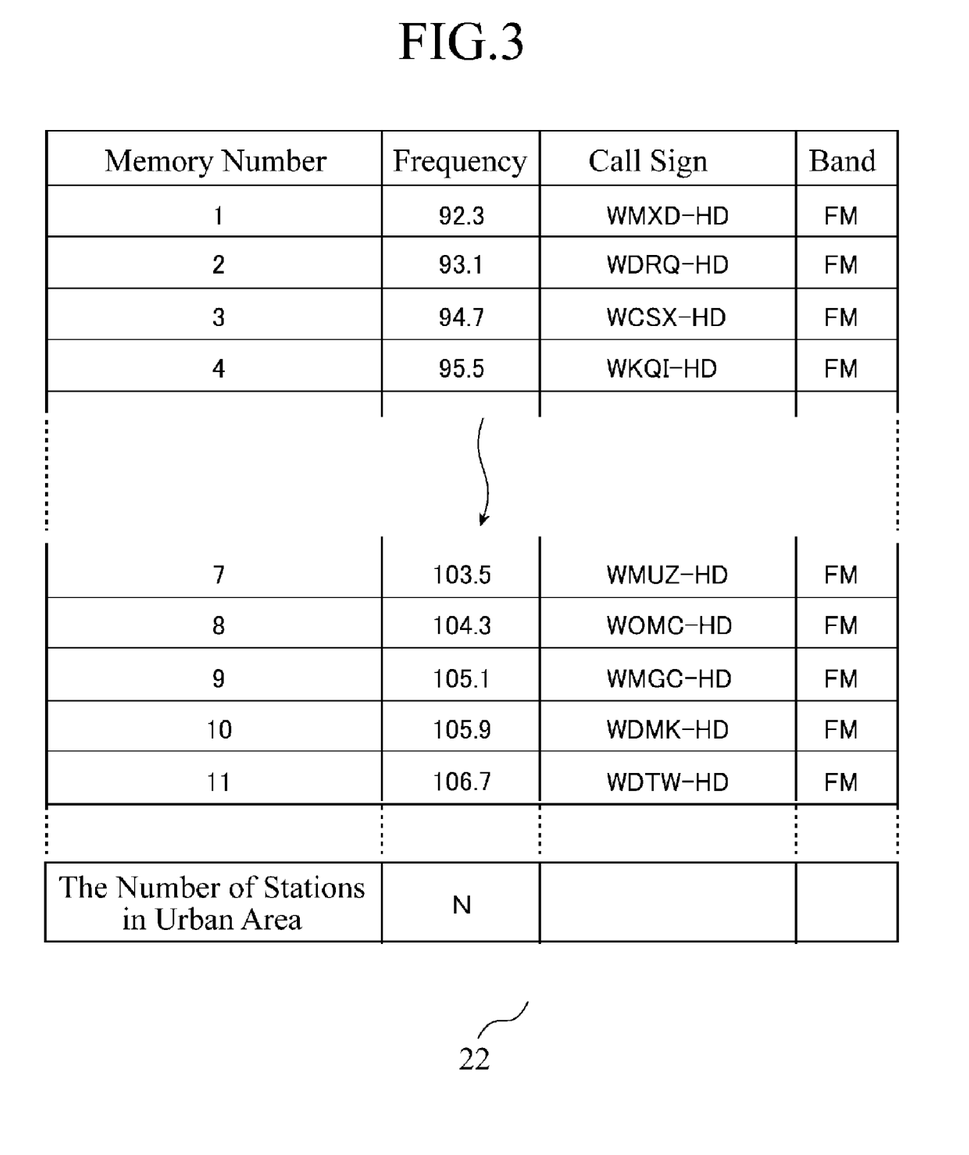
FIG. 3 is a table showing an example of data structure of memory of receiving stations of the radio receiver in accordance with the first embodiment of the present invention.

FIG. 3 is a table showing an example of data structure of the receiving station memory 22. Here, a state where receivable broadcasting station information are stored after tuning operation has been performed in Detroit is shown, and memory numbers 1-11 and the corresponding receivable frequencies (Frequency) are stored with a correspondence established therebetween. Further, call signs (Call Sign) are stored from a station list, which is previously held, with a correspondence established between a station and the corresponding frequency. Furthermore, "Band" (Band) shows the types of frequency band. A predetermined number N of broadcasting stations in an urban area is selected from among 4-40 stations as discussed above.

The above-discussed predetermined number N is set by fixing the number in an HD radio broadcasting receiver, or the number may be arranged to be set by auto-acquiring it from the positional information obtained from a navigation system or a PND system.

As discussed above, according to the HD radio receiver of the first embodiment of the present invention, when the number of receivable broadcasting stations acquired by the station selection operation is a predetermined number or more, the controller 21 disables diversity reception, thus allowing for the effect of multipath interfere during the running in an urban area, for example, which enables diversity reception control adapted for reception environments changing in real time.

In this context, here, the receivable broadcasting station is assumed to be a broadcasting one from which the received signal strength indication that is outputted by the reception quality detecting section 17 is a predetermined value or more, or a broadcasting one existing within a predetermined distance from a vehicle position acquired from a navigation system or the like.

Further, the explanation has been given by assuming that according to the HD radio receiver of the first embodiment of the present invention, diversity reception is disabled, for example, in an urban area having comparatively many receivable broadcasting stations; however, the frequency of antenna switching may be also reduced without fixing a receiving antenna.

Second Embodiment

Figure 4:
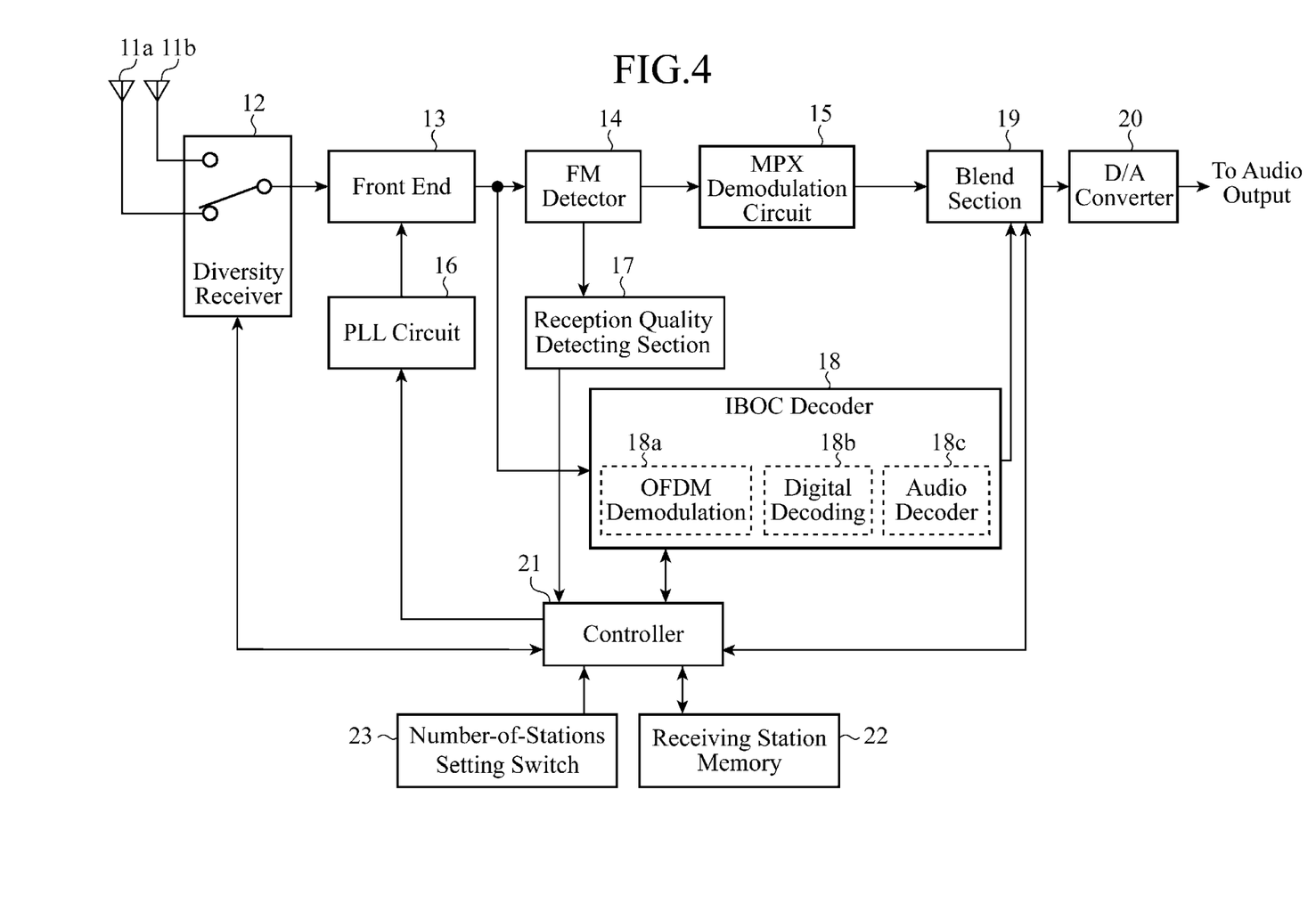
FIG. 4 is a block diagram showing a configuration of a radio receiver in accordance with a second embodiment of the present invention.

FIG. 4 is a block diagram showing a configuration of a hybrid radio receiver (an HD radio receiver) in accordance with a second embodiment of the present invention.

The second embodiment discussed hereinbelow is different from the first embodiment shown in FIG. 1 in that the second embodiment has further provided therein a number-of-stations setting switch 23 working as an operation input section in addition to the antennas 11a, 11b, the diversity receiver 12, the front end 13, the FM detector 14, the MPX demodulation circuit 15, the PLL circuit 16, the reception quality detecting section 17, the IBOC decoder 18, the blend section 19, the DAC 20, and the controller 21, and the receiving station memory 22, all of which are provided in the HD radio receiver in accordance with the first embodiment, shown in FIG. 1.

It is assumed that the number-of-stations setting switch 23 to be composed of, for example, a toggle switch arranged to increase a numerical value each time the right edge thereof is pushed and reduces a numerical value each time the left edge thereof is pushed, or a rotary switch arranged to increase a numerical value by clockwise rotation and reduce a numerical value by counterclockwise rotation.

During the running in an urban area or other area, a user operates the number-of-stations setting switch to select and set a predetermined number in the urban area or other area from among 4-40 broadcasting stations. Excellent receiving conditions can be obtained by setting a predetermined number according to the number of broadcasting stations in a district where a user resides. Further, user's intention is reflected by making user setting, and thus convenience can be offered to the user.

Here, since the number of receivable broadcasting stations is influenced by the state of electric wave, weather, and the like in day and night, the effect of enabling the selection of a predetermined number N that is more suitable for an area where broadcasting is now being received is also obtained.

In another embodiment discussed hereinbelow, when a user refers to a station list of a user's current area and operates the number-of-stations setting switch 23 to input the number of broadcasting stations existing in the area, the controller 21 searches the table shown in FIG. 5 to set the predetermined number N defined according to the number of stations, compares the predetermined number N set here with the number of receivable broadcasting stations stored in the receiving station memory 22, and thereby controls the ON/OFF operation of the antenna switching performed by the diversity receiver 12.

As described above, in metropolitan areas such as Chicago and Detroit, 40 or more broadcasting stations are concentrated; however, in other urban areas, several stations are broadcasting. Thus, there is a large difference between the numbers of broadcasting stations in a metropolitan area and a small and medium-sized metropolitan area. When a user residing in a large city, moves to a small or a medium-sized city, the diversity control is not turned off if the predetermined number having been used in a metropolitan area is left uncontrolled, and out-of-synchronization easily occurs.

Further, during the running in an urban zone in a metropolitan area, a user is in a state where the frequencies of several tens of broadcasting stations can be received. Thereafter, when the user drives off from the urban area in the metropolitan district and enters an area where digital reception is still possible though the number of receivable broadcasting stations reduces to ten-odd, if the diversity reception is carried out, "out-of-synchronization" occurs because of the phase difference between switched antennas.

In such a state, by setting the predetermined number about the number of broadcasting stations at N1, N2, or N3 (where N1>N2>N3) for a metropolitan area, a small and medium-sized metropolitan area, and the other area, respectively, it is possible to more finely set the predetermined number N about the number of broadcasting stations according to the number of broadcasting stations existing in the urban area.

Figure 5:
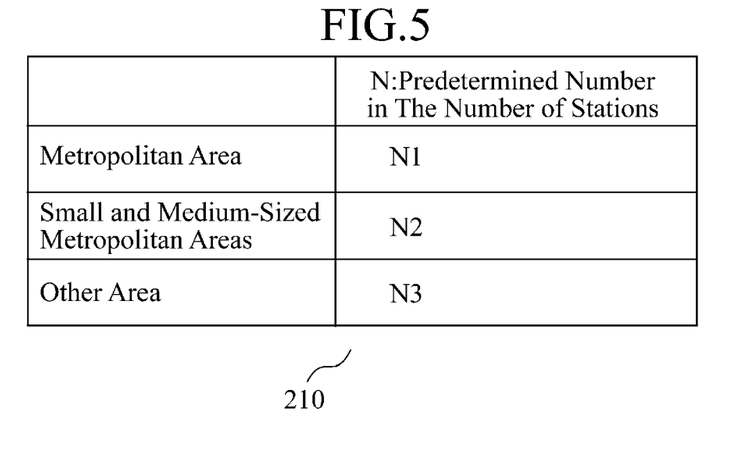
FIG. 5 is a table showing an example of table structure illustrating the criteria for judgment on the diversity reception control of the radio receiver in accordance with the second embodiment of the present invention.

FIG. 5 is a table showing an example of data structure of a table 210 searched in determining a predetermined number becoming criteria for judgment about diversity reception suppression in an HD radio receiver in accordance with the second embodiment of the present invention.

In the table 210, predetermined numbers Ns on the number of receivable broadcasting stations, which become the criteria for judgment about the suppression control of the diversity reception are defined for each of a metropolitan area, a small and medium-sized metropolitan area, and other region, and the predetermined numbers are arranged to be stored in the built-in memory of the controller 21.

Figure 6:
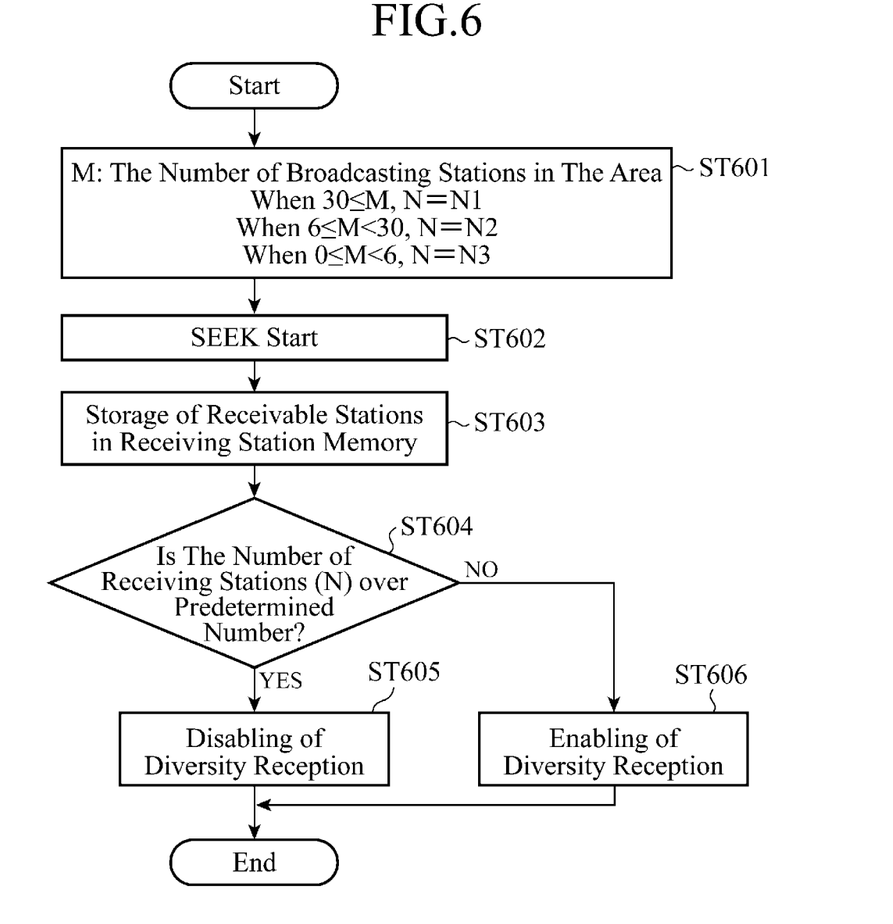
FIG. 6 is a flowchart showing an operation of the radio receiver in accordance with the second embodiment of the present invention.

FIG. 6 is a flowchart showing an operation of the HD radio receiver in accordance with the second embodiment of the present invention, and more specifically, shows the procedure of the controller 21 shown in FIG. 4.

The operations of the HD radio receiver in accordance with the second embodiment of the present invention shown in FIG. 4 and FIG. 5 will now be described in more detail with reference to the flowchart shown in FIG. 6.

First, by operating the number-of-stations setting switch 23 composed of a toggle switch, a rotary switch or the like, a user inputs the number M of broadcasting stations contained in an area where a vehicle under now broadcast reception exists with reference to the station list of the area.

The controller 21 receives the input to make a judgment on the number M of broadcasting stations: by referring to the table 210 shown in FIG. 5, for example, the controller sets the predetermined number N at N1 by regarding the area as a metropolitan area when M is 30 or more, sets the predetermined number N at N2 by regarding the area as a small and medium-sized metropolitan area when $6 \leq M<30$, and sets the predetermined number N at N3 by regarding the area as another area when M is less than 6, respectively (step ST601). For example, by setting N1 at 35, N2 at ten, and N3 at two, respectively, the control of diversity reception with high accuracy becomes possible.

Then, the controller 21, by the SEEK switch being operated, performs a station selection operation while changing the frequency division ratio of the PLL circuit 16 (step ST602), and stores the frequencies of receivable broadcasting stations in the receiving station memory 22 (step ST603).

Judgment on whether a broadcasting station is a receivable one is made by referring to the RSSI outputted by the reception quality detecting section 17.

Subsequently, the controller 21 counts the number of receivable broadcasting stations stored in the receiving station memory 22 to compare the number of the receivable broadcasting stations with the predetermined numbers N set in step ST601, and judge about whether there are receivable broadcasting stations of the predetermined number N or more (step ST604).

Here, when it is judged that there are receivable broadcasting stations more than the predetermined number N (step ST604 "YES"), the controller 21 controls the diversity receiver 12 to disable the diversity reception (step ST605), and when there are not stations of the predetermined number N or more (step ST604 "NO"), the controller controls the diversity receiver 12 to enable the diversity reception (step ST606).

As discussed above, according to the HD radio receiver of the second embodiment of the present invention, the controller 21 sets the predetermined number N based on information on the number of broadcasting stations acquired from the number-of-stations setting switch 23 consisting of a toggle switch, a rotary system switch, or the like, compares the number of receivable broadcasting stations acquired by the station selection operation with the predetermined number N, which is previously set, and controls the diversity receiver 12 based on the result of the comparison to suppress the frequency of antenna switching, thus enabling the diversity reception control suitable for an area changing in real time as a vehicle moves to be performed.

Hereupon, in accordance with the second embodiment discussed above, as with the first embodiment, in receiving IBOC broadcasting, the diversity reception control is switched according to an area where a vehicle is running, to receive the broadcasting by turning off the diversity reception, for example, in an urban area and the environs thereof, with the broadcast reception fixed by using either one of the antennas (11a or 11b), thus enabling the "out-of-synchronization" occurring at the antenna switching to be avoided. Further, while running in an urban area and the surrounding area thereof, the frequency of occurrence of antenna switching is increased because of the generation of multipath caused by high-rise buildings or the like; however, the controller recognizes that the vehicle is running in an urban area according to the number of receivable broadcasting stations to suppress the antenna switching, thus enabling "out-of-synchronization" to be avoided. In contrasted to that, while running in an area remote from an urban area, electric field strength tends to lower, and analog reception is mainly carried out. Thus, the diversity reception is controlled to be turned on to receive broadcasting by an antenna in good receiving condition, thus enabling the reception quality to be further enhanced. Note that the frequency of occurrence of multipath is low in an area far from an urban area, and thus the occurrence of "out-of-synchronization" is infrequent.

Remark parenthetically, in an HD radio receiver synchronized with a navigation system with a built-in GPS and a PND, it is easy to change the number M of broadcasting stations by judging whether the place through which a vehicle is passing is in a metropolitan area, a small and medium-sized metropolitan area, or other area from the vehicle positional information. Furthermore, the method is also effective, of counting the maximum value of the number of receivable broadcasting stations after SEEK operation has been carried out one time, and regarding the result as the number of broadcasting stations in the area to make a judgment about whether the area is a metropolitan area, a small and medium-sized metropolitan area, or other area.

When the maximum value of the number of receivable broadcasting stations becomes from 30 or more to between 6 and 30, the controller 21 judges that the vehicle has entered an area of small and medium cities to change the predetermined number N1 on the number of stations, which has been first set, to smaller N2, thus enabling "out-of-synchronization" occurring at antenna switching to be avoided.

Furthermore, the predetermined number N need not be limited to an integer. Of receivable broadcasting stations, some broadcasting stations have a receiving state changed in day and night or by the weather or the like. By counting the number of broadcasting station that can be received only at nighttime as 0.5, for instance, it is also possible to express the number of receivable broadcasting stations using a real number.

Moreover, all of the functions shown in FIG. 1 and FIG. 4, which are possessed by the controller 21, may be implemented by software, or at least a portion of the functions may be also implemented by hardware.

For example, the data processing in which the controller 21, when the number of receivable broadcasting stations acquired by the station selection operation is a predetermined number or more, controls the diversity receiver 12 to suppress the frequency of antenna switching, may be also performed by computer with one or a plurality of programs, or at least a portion of the data processing may be also carried out by hardware.

INDUSTRIAL APPLICABILITY

The radio receiver according to the present invention enables diversity reception control with high flexibility, and can function as an extremely convenient hybrid radio receiver. Thus, the radio receiver is suitable for use in a vehicle radio receiver, especially, which receives analog broadcasting and terrestrial digital radio broadcasting simultaneously.

The invention claimed is:

1. A radio receiver comprising:
   a diversity receiver having a plurality of antennas, and receiving a terrestrial digital radio broadcast by antenna switching; and
   a controller which counts a number of receivable broadcasting stations by a station selection operation, and which disables the diversity reception by the diversity receiver when the counted number of receivable broadcasting stations is a preset predetermined number or more.

2. The radio receiver according to claim 1, wherein the controller counts the frequency of a broadcasting station having the received electric field strength of a predetermined value or more as the number of the receivable broadcasting stations.

3. The radio receiver according to claim 1, further comprising:
   a position detecting section for detecting the current position of a vehicle; and
   a storage section for storing facility information at least including broadcasting station information together with map information,
   wherein the controller refers to the storage section and counts broadcasting stations existing within a predetermined distance from the current position of a vehicle specified by the position detecting section as the number of receivable broadcasting stations.

4. The radio receiver according to claim 1, further comprising an operation input section for setting and inputting the predetermined number,
   wherein the controller disables the diversity reception when the number of receivable broadcasting stations which is obtained by the station selection operation is the predetermined number, obtained from the operation input section, or more.

5. The radio receiver according to claim 1, further comprising:
   a storage section for storing a plurality of predetermined numbers corresponding to the number of broadcasting stations; and
   an operation input section for setting and inputting the information on the number of broadcasting stations existing within a user's current area,
   wherein the controller sets the predetermined number determined based on the number of broadcasting stations acquired from the operation input section, and disables the diversity reception when the number of receivable broadcasting stations acquired by the station selection operation is the set predetermined number or more.

6. The radio receiver according to claim 5, wherein the predetermined number is set according to the maximum value of the number of broadcasting stations receivable in a user's current area.

* * * * *